Figure 1:
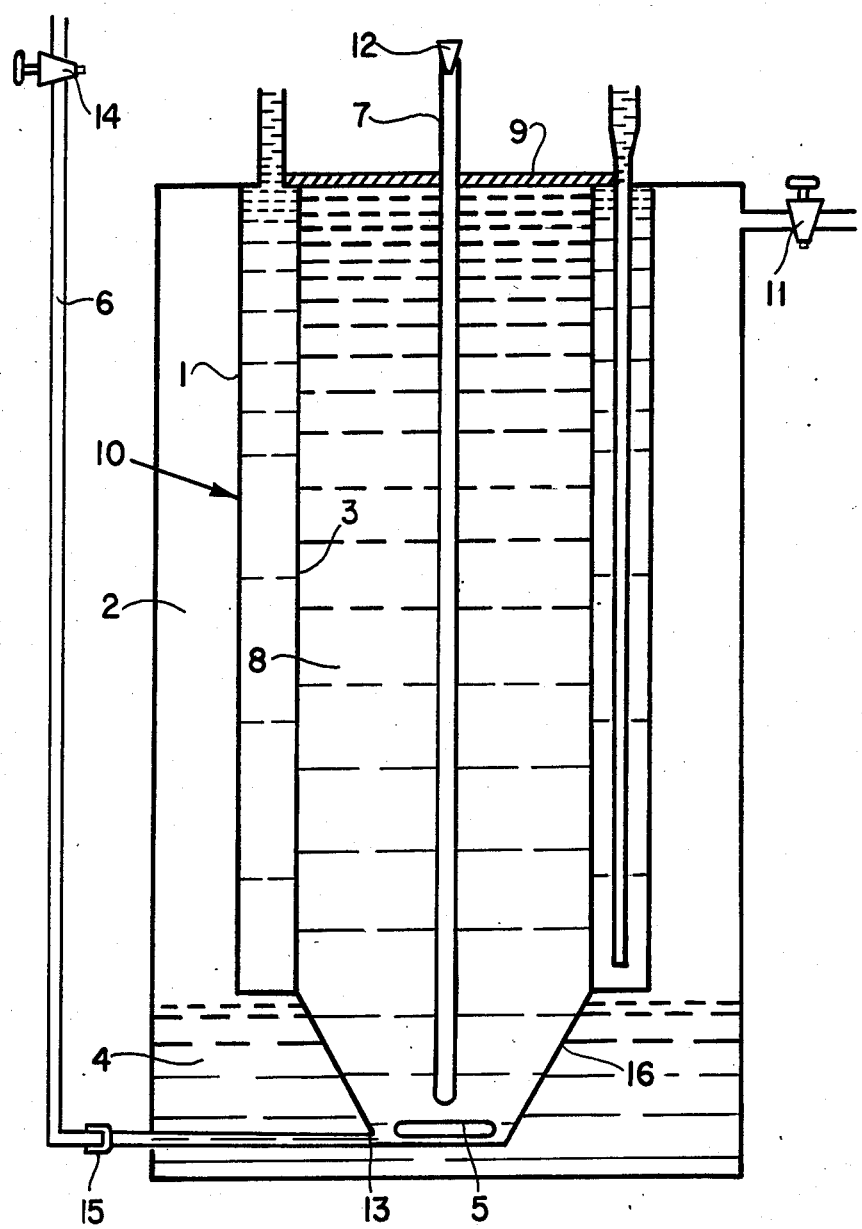

United States Patent [19]

Ruijten et al.

[11] Patent Number: 4,697,428
[45] Date of Patent: Oct. 6, 1987

[54] DEVICE FOR CONCENTRATING SOLUTIONS

[75] Inventors: Henri M. Ruijten; Hans De Bree; Peter H. Van Amsterdam, all of Weesp, Netherlands

[73] Assignee: Duphar International Research B.V., Weesp, Netherlands

[21] Appl. No.: 841,630

[22] Filed: Mar. 20, 1986

[30] Foreign Application Priority Data

Mar. 25, 1985 [NL] Netherlands ............... 8500859

[51] Int. Cl.⁴ .................................................. B01D 9/04
[52] U.S. Cl. ............................................ 62/124; 62/68; 62/544
[58] Field of Search .................. 62/68, 124, 123, 532, 62/544

[56] References Cited

U.S. PATENT DOCUMENTS

| | | | |
|---|---|---|---|
| 1,865,614 | 7/1932 | Caldwell | 62/68 |
| 2,896,418 | 7/1959 | Berger | 62/124 |
| 3,121,627 | 2/1964 | Harris, Sr. | 62/124 |
| 3,411,309 | 11/1968 | Skrebowski et al. | 62/123 |
| 3,443,393 | 5/1969 | Goldberg | 62/124 |
| 3,531,944 | 10/1970 | Lindley | 62/544 |
| 3,543,531 | 12/1970 | Adams | 62/124 |
| 4,296,612 | 10/1981 | Allo | 62/532 |

FOREIGN PATENT DOCUMENTS 38146 12/1935 Netherlands .

Primary Examiner—Ronald C. Capossela
Attorney, Agent, or Firm—Stevens, Davis, Miller & Mosher

[57] ABSTRACT

The invention relates to a device for concentrating solutions by partly freezing-out solvent, consisting of a vessel surrounded laterally by an insulated cooling jacket, the vessel comprising a stirring means and a draining aperture at the bottom. The cooling jacket does not extend down to the lowermost portion of the vessel. The lowermost portion of the vessel in which the stirring means and the draining aperture are accommodated, externally comprises, preferably is surrounded by, a heating medium.

9 Claims, 5 Drawing Figures

DEVICE FOR CONCENTRATING SOLUTIONS

The invention relates to a device for concentrating solutions by partly freezing-out the solvent.

Such a device has been known for many decades already. For example, a device for and a method of recovering certain constituents from solutions by solidifying the solvent and then separating the solid and liquid phases from each other are known from Netherlands Patent Specification No. 38146 from 1936. In this manner, for example, salts can be separated from solutions, or concentrates can be obtained from liquid, for example, milk, by freezing-out the water.

The invention relates more in particular to the above-mentioned device for concentrating solutions, consisting of a vessel optionally closed on its upper side by a cover and surrounded laterally by an insulated cooling jacket, the vessel comprising a stirring means and at the bottom a draining aperture, the cooling jacket not extending down to the lowermost portion of the vessel. Such a device is disclosed in Netherlands Patent Specification No. 88150. In this known freezing vessel or freezing reservoir an aqueous solution is cooled to a temperature at which ice is formed. The object of the stirring means is to stir the liquid with the ice particles and to scrape the walls of the reservoir so that the slurry of ice particles is kept in continuous motion. A valve through which the contents of the vessel can be drained or removed is provided in the bottom of the vessel. After draining the slurry of ice particles from the reservoir, it is provided on a sieve, the slurry being kept in motion. After draining on the sieve, the ice is separated from the concentrated liquid by centrifuging.

It will be obvious that the above method of concentrating aqueous solutions is very laborious and that during the processes of draining and centrifuging the ice particles will partly go into solution again so that the ultimate result of the concentration is poor. Moreover, and this is even a greater disadvantage, during stirring the slurry of ice particles considerable inclusions of the constituents to be concentrated in the ice particles takes place both in the freezing reservoir and on the sieve, so that a considerable part of the constituents to be concentrated remains behind in the centrifuge after centrifuging and hence is lost.

It is the object of the present invention to provide a device for concentrating solutions by partly freezing-out the solvent in which the above disadvantages does not occur. This object can be achieved by means of a device as described hereinbefore, namely consisting of a vessel optionally closed on its upper side by a cover and surrounded laterally by an insulated cooling jacket, the vessel comprising a stirring means and at the bottom a draining aperture, the cooling jacket not extending down to the lowermost portion of the vessel, which device is characterized according to the invention in that the lowermost portion of the vessel in which the stirring means and the draining aperture are present, externally comprises, preferably is surrounded by, a heating medium. As a heating medium is used, for example, a heating plate, but a heating medium which completely surrounds the lowermost portion of the vessel is to be preferred for a more uniform heating of said lowermost portion. Examples of suitable heating media completely surrounding said lowermost portion of the vessel are electric heating jackets and heating baths; the contents of the latter can be kept at the desired temperature by means of a suitable heating device. The contents of heating baths may be solid or liquid and preferably consist of a sufficiently heat-conducting material, for example, sand, glass beads or silica gel, or a liquid which is not or poorly volatile at the desired temperature, for example, a heatable oil, such as silicon oil, or a higher polyfunctional alcohol, such as glycerol.

For operating the device according to the invention, the solution to be concentrated is introduced into the vessel after its draining aperture has been closed. A cooling medium is then passed through the cooling jacket. The conventional cooling liquids, for example, a suitable alcohol, such a methanol, ethanol, or isopropanol, are to be considered as a cooling medium. During the cooling process, the solution in the lower portion of the vessel is stirred and simultaneously kept at a slightly elevated temperature, well over the freezing-point of the solution. The solvent now begins to freeze-out, starting on the side wall of the vessel surrounded by the cooling jacket, while the solution in the lower portion of the vessel remains liquid. It has been found that with simultaneous heating and stirring of the solution in the lower portion of the vessel, the solvent crystallizes out in a substantially pure state and deposits on the side wall of the vessel as a frozen layer. The other contituents of the solution accumulate in the liquid in the lower portion of the vessel. When the concentration process has made sufficient progress, the concentrated solution may be drained from said lower portion of the vessel. Simultaneous stirring and heating of the solution which becomes more and more concentrated has proved to be necessary to avoid the formation of so-called wild crystal masses, i.e. of lumps or clusters of frozen solvent which have not adhered to the side wall of the vessel. Upon draining the concentrated solution through the draining aperture situated in the heated lowermost portion of the vessel, the crystallized solvent remains adhered to the side wall of the vessel.

It will be obvious from the above description that the concentrating of solutions in the device according to the invention can be carried out in a particularly simple manner and can even be carried out overnight without supervision. it will moreover become apparent from the ensuing specific examples that concentrating in the device according to the invention can be carried out very effectively, i.e. that the quantity of solvent can be reduced very considerably with one single operation, for example, to 20% of the original volume, while simultaneously the constituents to be kept in the concentrate are found for the greater part, for example, for at least 70%, in the concentrated liquid. Other advantages of the device according to the invention are that the processing for concentrating the device requires only small preparation, gives hardly any chance of disturbances and, when the concentration might nevertheless fail, can be repeated very simply. In the latter case, the frozen solvent is thawed again, for example, by passing a heating liquid through the cooling jacket, after which the process may start again.

The device according to the invention serves in particular for concentrating aqueous solutions, but solutions of other solvents or mixtures of solvents, for example water with a water-miscible solvent like methanol, ethanol or acetone, can also be concentrated by means of the device according to the invention. The temperature of the cooling medium to be passed through the cooling jacket should, of course, be matched to the freezing-point of the solvent or mixture of solvents used.

Various body liquids, for example, urine, lumbal fluid or blood plasma, can be concentrated by means of the device according to the invention. As a result of this it is possible to detect and determine, even isolate, traces of medicines and metabolites hereof in these liquids. However, the device according to the invention is meant not only for pharmaceutical or clinical use, but it may also be used in all the other fields where analyses have to be carried out or concentration is desired, for example, in the analysis of drain water, drinking water, rain water, soil water and surface water, both quantitatively and qualitatively, in the detection, determination and isolation of, for example, pesticides and metabolites thereof in extracts of, for example, crops and soil, in soil water and in surface water, and in concentrating waste liquids including waste liquids of bioindustries.

The device according to the invention is preferably constructed in such manner that the diameter of the lowermost portion of the vessel decreases towards the bottom until a diameter has been reached which is just large enough for the stirring means to operate satisfactorily. As a result of such a shape, efficient stirring and heating of said lowermost portion is promoted, while after concentration the concentrated liquid can more easily be drained from the draining aperture in the bottom.

Upon cooling the solution in the device according to the invention it is of importance that during the freezing-out process the solvent can very quietly deposit on the side wall of the vessel and can from there freeze up inwardly without, during the crystal formation, inclusion of other constituents occurring and/or solvent crystals or conglomerates hereof landing in the concentrated liquid. It is therefore desirable for the solution to be not moved at the area where the solvent is to crystallize out. Consequently, a so-called magnetic stirrer which can impart a rotating movement from outside to the stirring means, in this case a rod-shaped, fin-shaped or cross-shaped body having a metal core, is excellently suitable to keep the heated liquid in the lower portion of the vessel in motion. The said magnetic stirrer is arranged below the vessel and, if it comprises electric heating, can, for example, simultaneously ensure the heating of the heating bath which is preferably used.

When the concentrating process is continued, the contents of the vessel, dpenendent on the height of the vessel, may freeze up entirely on the upper side. In that case, in order to enable the draining of the concentrated liquid after completion of the concentrating, an aeration tube is necessary whose one end opens into the lowermost portion of the vessel and whose other end communicates with the outer air. Such an aeration tube hence is generally highly desirable to facilitate concentration to, for example, less than 50% of the original liquid.

In order to stimulate crystallization of the solvent on the side wall of the vessel surrounded by the cooling jacket, the vessel internally preferably comprises crystallization nuclei. Suitable crystallization nuclei for the solvent are formed by a jacket of gauze, preferably a synthetic material gauze, for example nylon gauze, which jacket is placed just against or at a short distance from the side wall of the vessel.

The invention will now be described in greater detail with reference to a preferred embodiment which is shown in the drawings. The operation of the device according to the invention will furthermore be illustrated with reference to a few examples.

FIG. 1 is a longitudinal sectional view of a device according to the invention, and FIGS. 2, 3, 4, and 5 are sectional views of the same device, now in operation during the freezing process.

The device shown in FIG. 1 comprises a glass vessel 10 having a glass cooling jacket 1 through which an organic liquid (for example, isopropanol, ethanol or methanol) cooled by a cooling device (cryostate) at a temperature of 253–263 K. is circulated by pumping. The cooling jacket is insulated by means of a second, evacuated, jacket 2 which is closed by means of a cock 11. The aqueous solution 8 to be concentrated is present in the interior of the vessel. The vessel is closed by means of a cover 9 through which an aeration tube 7 extends down into the bottom of the solution. The aeration tube is closed at its upper end by means of a cock or stopper 12. The liquid to be concentrated can be stirred by means of a stirring rod (stirring flea) 5 which is rotated by means of a magnetic stirrer not shown in the drawings. The draining aperture 13 of the vessel communicates with a tube 6 which is closed by means of a cock 14 and is rotatable at 15. The tapering lower portion 16 of the vessel is not surrounded by the cooling jacket but is present in a heating bath 4 which is filled with sand. A jacket 3 of nylon gauze which serves as crystallization nuclei for the ice crystals is present internally against the side wall of the vessel.

Figure 2:
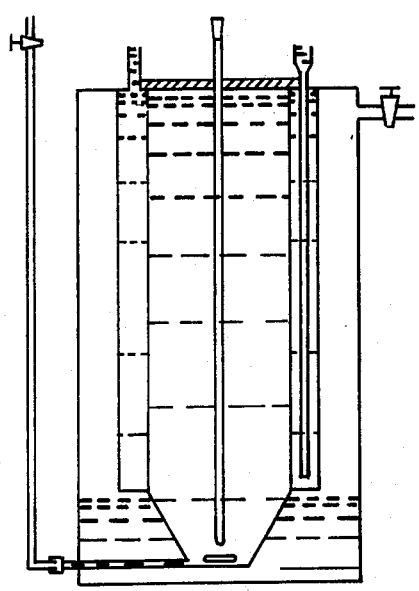
Figure 3:
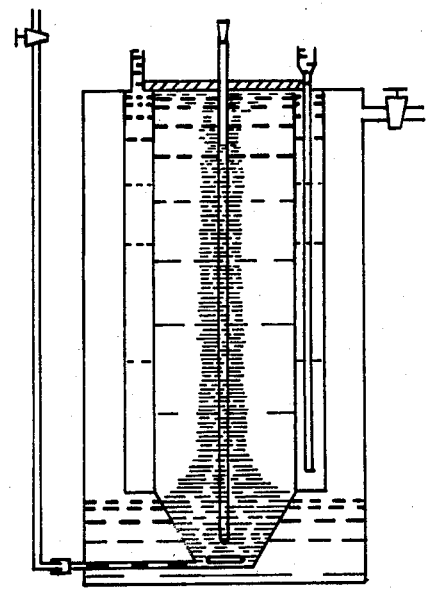
Figure 4:
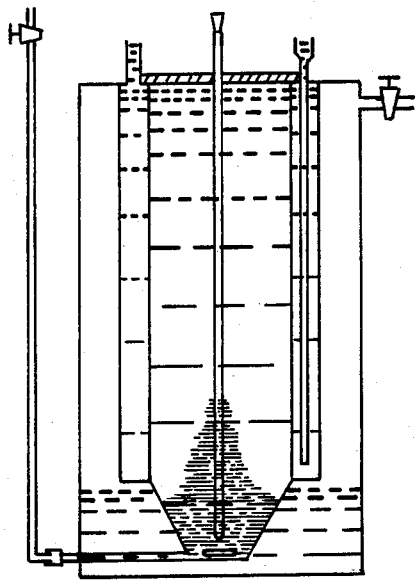
Figure 5:
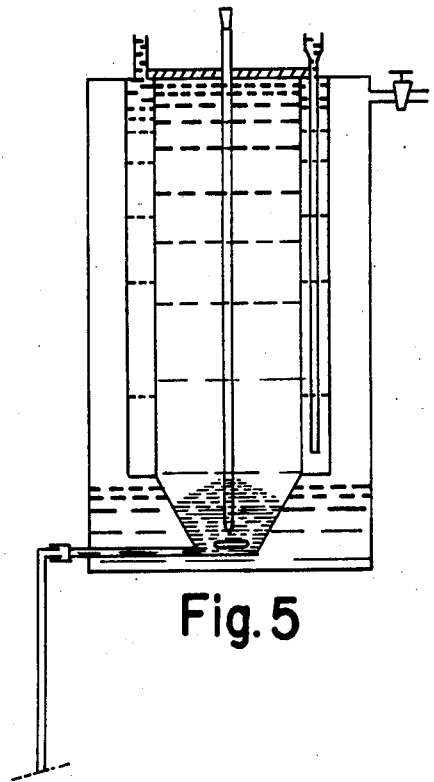

During operation of the device shown in FIG. 1, the solution to be concentrated is cooled by the cooling liquid and starts freezing at the side wall surrounded by the cooling jacket. Simultaneously, the liquid in the lower portion of the vessel is kept at an elevated temperature by means of the heating bath and is stirred by means of the magnetic stirrer. FIG. 2 shows the situation after cooling for 0–2 hours, dependent on the dimensions of the vessel, the temperature of the cooling medium and the nature of the solution to be concentrated. The layer of ice begins to grow, first at the wall. FIG. 3 shows the situation after cooling for 3–8 hours; the layer of ice grows thicker. When the solution becomes more concentrated, the freezing point drops. A stronger cooling is necessary in order to be able to continue the freezing process. FIG. 4 shows the situation in which the upper side of the liquid is entirely frozen up. This situation is reached after 9–24 hours. In the situation shown in FIG. 5 the desired concentration has been completed; this situation has been reached 25–48 hours after the beginning of the cooling process. After opening the cock or stopper 12 of the aeration tube 7, the draining tube 6 is turned through approximatley 180° about the fulcrum point 15, after which the cock 14 is opened. The concentrated liquid may now be drained.

For illustration, a few examples of a freeze concentration in the device described hereinbefore will now be described.

(a) A quantity of 4'-chloro-5-methoxy valerophenone (E)-O-(2-aminoethyl)oxime fumarate (1:1) (Clovoxamine) was adminsterd to a hamster, which substance was radioactively labelled with $^{14}C$. The administered dose of the pharmacon was 36 mg per kg of body weight. After administration, the hamster's urine was collected. Totally 1230 of urine were concentrated to 290 ml by means of the above-described freeze-concentration process. 70% of the radioactivity present in the collected quantity of urine were found in the concentrate.

(b) A quantity of 0.25 mg per kg of body weight of $^{14}$C-labelled 1-cyclohexyl-4-[ethyl(p-methoxy-$\alpha$-methyl-phenethyl)amino]-1-butanone hydrochloride (Secoverine) were administered to a human being. After administration the urine was collected. Totally 1700 ml of urine were concentrated to 310 ml by means of the above-described freeze-concentration process. 86% of the radioactivity present in the collected quantity of urine were found in the concentrate.

We claim:

1. A device for concentrating a solution by partly freezing out a solvent, said device comprising:
   (a) a vessel for containing said solution;
   (b) an insulating cooling jacket surrounding said vessel except at a lowermost portion of said vessel;
   (c) said vessel comprising (i) a stirring means for stirring the solution in the vessel, and (ii) a bottom portion including a draining aperture for draining the solution after concentration thereof has been completed, said stirring means and said draining aperture being positioned at said lowermost portion of said vessel; and
   (d) a heating medium disposed externally of said vessel at said lowermost portion of said vessel for heating only said solution at said lowermost portion of the vessel.

2. A device as claimed in claim 1, characterized in that the lowermost portion of the vessel is surrounded by said heating medium.

3. A device as claimed in claim 1 or 2, characterized in that the lowermost portion of the vessel is tapered towards a bottom portion of the vessel until a bottom diameter has been reached which is just large enough to permit a ready operation of the stirring means.

4. A device as claimed in claim 3, characterized in that the stirring means comprises one of a rod-shaped, a fin-shaped and a cross-shaped member comprising a metal core and a magnetic stirrer means for rotating said member.

5. A device as claimed in claim 1, characterized in that the vessel comprises an aeration tube havng one end which opens into the lowermost portion of the vessel and another end which communicates with the outside.

6. A device as claimed in claim 1, characterized in that the vessel comprises internally crystallization nuclei for the solvent on the side wall surrounded by the cooling jacket.

7. A device as claimed in claim 6, characterized in that the crystallization nuclei for the solvent are formed by a jacket of gauze.

8. A device as claimed in claim 7, wherein said jacket of guaze is formed of a synthetic material.

9. A device as claimed in claim 1, further comprising a cover disposed at an upper side of said vessel to close said vessel.

* * * * *